United States Patent [19]

Coes, Jr.

[11] 3,909,991
[45] Oct. 7, 1975

[54] PROCESS FOR MAKING SINTERED ABRASIVE GRAINS

[75] Inventor: Loring Coes, Jr., Princeton, Mass.

[73] Assignee: Norton Company, Worcester, Mass.

[22] Filed: Sept. 22, 1970

[21] Appl. No.: 74,257

[52] U.S. Cl. .................. 51/309; 264/64; 264/65
[51] Int. Cl.[2] .................. C09C 1/68; C09K 3/14
[58] Field of Search ............ 51/309, 295, 307, 308; 264/65, 313, 332, 64; 75/223, 226

[56] References Cited
UNITED STATES PATENTS

| | | | |
|---|---|---|---|
| 2,883,297 | 4/1959 | Jeitner | 51/309 |
| 2,979,414 | 4/1961 | Ryshkewitch | 51/309 |
| 2,990,602 | 7/1961 | Brandmayr | 264/332 |
| 3,181,939 | 5/1965 | Marshall | 51/309 |
| 3,221,365 | 12/1965 | Mattern et al. | 264/332 |
| 3,279,917 | 10/1966 | Ballard et al. | 264/332 |
| 3,284,195 | 11/1966 | Googin et al. | 264/332 |
| 3,387,957 | 6/1968 | Howard | 51/309 |
| 3,416,905 | 12/1968 | Waugh | 51/298 |
| 3,455,682 | 7/1969 | Barbaras | 264/332 |
| 3,491,491 | 1/1970 | Ueltz | 51/309 |
| 3,491,492 | 1/1970 | Ueltz | 51/309 |
| 3,510,994 | 5/1970 | Amero et al. | 51/295 |
| 3,580,708 | 5/1971 | Ogawa et al. | 51/309 |
| 3,589,880 | 6/1971 | Clark | 264/332 |

*Primary Examiner*—Donald J. Arnold
*Attorney, Agent, or Firm*—Arthur A. Loiselle, Jr.

[57] ABSTRACT

Isostatic hot-pressing is adapted for the manufacture of sintered abrasive grains, including random shaped and preshaped tumbling media. Abrasive grains are preshaped from the desired material which has first been reduced to a submicron sized powdered, and then the preshaped particles are hot-pressed while suspended in a high temperature isostatic pressing medium like graphite, boron nitride or the like. The resulting sintered particles are denser and more finely crystalline than particles of the same composition made by other known methods.

2 Claims, 1 Drawing Figure

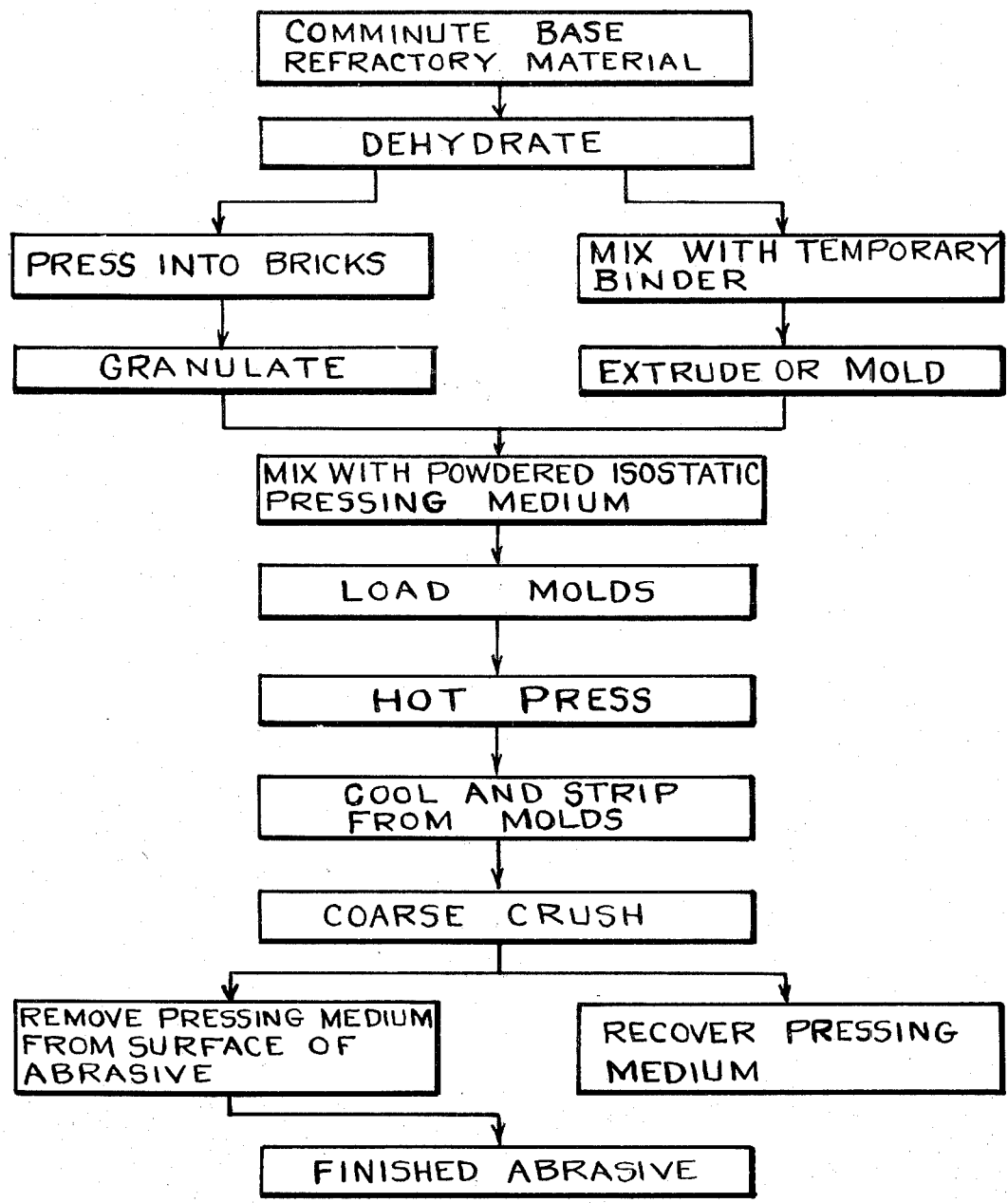

PROCESS FOR MAKING SINTERED ABRASIVE GRAINS

BACKGROUND OF THE INVENTION

The invention relates to the process for making high density, finely crystalline, sintered abrasives, and to the abrasive products resulting therefrom.

The evolution of the grinding process in recent years, particularly heavy duty grinding like snagging, has been toward the use of very high grinding pressures and high operating speeds. These grinding conditions result in improved productivity and reduced grinding costs. This trend however has created a need for stronger, more durable abrasives than the more conventional types known heretofore. This need has been satisfied to some extent by the sintered aluminous abrasives of the Ueltz Pat. No. 3,079,243, the Bishop Pat. No. 3,239,970, and by the sintered alumina-zirconia abrasives disclosed by Amero in his Pat. No. 3,454,385. These sintered abrasives in various configurations such as those described by Bishop, and Ueltz mentioned supra have also been found to be superior for tumbling or barrel finishing of metal parts.

These abrasive materials are manufactured in one of two ways. Random shaped abrasives of this type, such as those described by Ueltz and Amero, are manufactured by first finely comminuting bauxite or other aluminous material, or mixtures of alumina and zirconia, generally admixed with water. This finely ground powder is then dried and compressed into bricks or slugs by the application of pressure at ambient temperature. The bricks or slugs are then broken up into the desired sized grains or granules which are then placed in a suitable container and fired to a temperature well below the fusion temperature of the material in point but at/or above the material's sintering temperature. The resultant mass of granules is lightly agglomerated but is readily broken up to individual finished grains ready to be utilized as a tumbling medium, or incorporated into the form of a grinding wheel with suitable grinding wheel binder materials. Preshaped abrasive materials such as those described by Bishop, and Howard in his Pat. No. 3,387,957, are manufactured by first finely grinding the base refractory material, as is done in the manufacturing process for the production of the random shaped abrasive grains, and dried. However, at this point the fine powder is usually mixed with a suitable temporary binder and the abrasives particles preformed by extrusion or compression molding into the desired shape. These shapes are then fired in a manner similar to that for the random shaped abrasive grains. Abrasive particles or granules, resulting from the foregoing processes, are tough, relatively dense and finely crystalline materials. Because these granules are subjected to pressure at essentially room temperature they are then necessarily substantially less than completely free of porosity i.e. the density of the resultant grains is significantly less than the true specific gravity of the base material used. Furthermore because of the heat treatment to which the cold pressed granules are subjected, significant crystal growth results, usually of the order of magnitude of at least a 100% increase in the average crystal size as compared to the crystal size of the finely ground base refractory material employed.

It is an object of the present invention to provide a novel process for the fabrication of sintered abrasives. A further object of the invention is to provide sintered abrasives which are essentially 100% of the true specific gravity of the base refractory material used to form said abrasives and which are ultra-finely mycrocrystalline in nature.

BRIEF DESCRIPTION OF THE DRAWING

The drawing is a flow chart showing the various steps of the present invention.

DESCRIPTION OF THE PREFERRED EMBODIMENTS

It has now been found that superior abrasives of the sintered type can be fabricated by the isostatic hot-pressing of preformed, unfired particles of base refractory material. The improved abrasive properties result from the fact that by virtue of the simultaneous application of heat and pressure the resultant abrasive particles have essentially an average crystal size not greater than the average particle size of the base refractory material used and have a specific gravity essentially equal to the true specific gravity of said base refractory material. Such abrasives are possible only through the simultaneous application of heat and isostatic pressing.

In order to discourage crystal growth the temperature must be below the fusion temperature of the refractory material yet must be above its sintering temperature; this alone however does not prevent crystal growth, as evidenced by the teachings contained in the Ueltz and Howard patents. However the application of isostatic pressure simultaneously with heating facilitates almost instantaneous compression of the particles to essentially theoretical density with the time at temperature being so short that no evident increase in average crystal size occurs.

In the preferred practice of the present invention a base refractory material e.g. natural or synthetic bauxite, spinel, alpha-alumina, zirconia, and mixes of these is first comminuted to an average particle size of less than one micron, the comminution being accomplished by any of the many known methods, although wet ball milling is preferred. The slurry of water and comminuted base refractory material is then freed of excess water by allowing the refractory material to settle and decanting the water and/or by subjecting the material to a filter-pressing process. The remaining water is then removed by evaporation preferably by subjecting the partially dehydrated material to heat.

If the abrasive being produced is of the random shaped granule type, the dehydrated powder is then pressed, at ambient temperature, into bricks or slugs preferably of the order of 1 to 2 inches in thickness. This is accomplished by merely properly filling a conventional steel mold setup and applying pressure to maximum densification. The bricks thus formed are easily processed to the desired particle size, as taught by Ueltz.

On the othr hand if the abrasive product desired is one of the pre-shaped type viz. rod shaped abrasive grain or any of the various tumbling media configurations, the dehydrated powder is first mixed with conventional temporary binders and lubricants and the so prepared mixture extruded through an appropriately shaped dye and the extrudate cut at whatever length desired. If the abrasive product of interest is one of the complexly shaped tumbling media which are currently in use, such as a pyramidal configuration, then the preformed particles may be compression molded in the convention manner.

With both the random shaped granules and the preshaped abrasive products the next step is the mixing of the unfired abrasive shapes with the isostatic pressing medium. The pressing medium can be any powdered material which will not sinter, melt, decompose, or react with the base refractory material making up the unfired abrasive particles. In the practice of the instant invention, graphite or boron nitride are preferred. The amount of pressing medium used relative to the amount of abrasive particles, can be varied widely. The minimum amount of pressing medium must be that which will provide a volume adequate to totally surround and separate each and every abrasive particle. Amounts of pressing medium approaching this minimum amount however, are undesirable from the point of view that the closer to this limit the amount of pressing medium approaches the lower is the yield of high quality finished abrasive product. There is no upper limit with respect to the amount of the pressing medium except that imposed by practicality. The optimum amount from both points of view is approximately 50% by weight of each.

When the unfired abrasive particles and the pressing medium have been blended together, the resultant mixture is then loaded into a series of mold setups, the mold being composed preferably of graphite however, any material stable at the temperatures at which the pressing is to be carried out, may be effectively employed. The filled molds are then moved into an induction press or the like and rapidly heated to the sintering temperature of the refractory material involved, at which point pressure is then exerted on the mold plates resulting in sintering and densification of the particulate material suspended in the pressing medium.

The mold setup is then ejected from the pressing station and rapidly cooled. The pressing temperature will vary with the particular base refractory material being used but for the materials of interest here a temperature range of from 1200° to 1600° is the effective range. The pressure also can vary widely, it being affected to some degree by the amount of pressing medium involved and the temperature, but is most affected by the thickness of the pressing medium-abrasive particle mixture. For most practical thicknesses of pressing medium-abrasive particle mixtures a pressure of not less than 2000 pounds per square inch is most desirable. The parameters, of these two variables, which facilitates the most rapid heating and pressing is the most desirable. If for example, the pressed thickness of the mixture would be of the order of 1 inch then the heat-up time would be about 10 minutes and the time during which pressure would be applied would be of the order of a minute or slightly less.

When the mold setups are removed from the pressing zone and cooled somewhat, the content thereof is removed and subjected to a coarse pressing operation such as jaw crushing, roll crushing, or the like being careful however to set the jaws or the rolls sufficiently wide enough apart to avoid crushing of the fired abrasive particles. The rough crushed mixture is then screened to remove the readily freed pressing medium while the fired abrasive particles, having some pressing medium adhering to the surface thereof, are further treated to remove this remaining material. This can be accomplished mechanically or by calcining the material in the presence of air if the pressing medium used was graphic. After mechanical cleaning or calcining, the abrasive is finished and ready to be used.

The resultant abrasive particles have an average crystal size equal to approximately the average particle size or the base refractory material employed and have a specific gravity essentially equal to the true specific gravity of said base refractory material. The abrasive particles of the present invention have a crystal size of less than one micron and usually less than 0.5 microns, and a specific gravity of not less than 96% and usually about 100% of the true specific gravity of the base refractory material used.

The following is an example of the preferred practice of the present invention.

EXAMPLE

One pound each of powdered graphite and unfired extruded bauxite such as that described in the aforementioned Ueltz patent and sold in the fired condition as 76 ALUNDUM by the Norton Company of Worcester, Mass., were mixed in a tumbling barrel. The extruded bauxite particles were number 10 grit. Graphite mold setups, including mold bands, measuring approximately 3 inches in diameter and 3 inches in height as well as appropriately dimensioned top and bottom plates were filled with a layer of the unfired bauxite pellets and graphite powder mixture, the layer being about 2 inches in depth. The graphite plates were positioned and each mold successively heated up to 1315°C in 12 minutes, in a nitrogen atmosphere, at which point a pressure of 4000 psi was applied to the mixture for approximately 1 minute. After the temperature-pressure cycle each mold was rapidly cooled and the contents thereof removed. The lightly agglomerated mixture was rough crushed on a 24 mesh screen, which caused the bulk of the graphite pressing medium to fall free of the fired abrasive particles. The abrasive particles carrying some adhered graphite were heat treated in air at 800°C for 4 hours. After cooling the abrasives was further cleaned by shaking on a 24 mesh screen. The finished abrasive was pink and porcellanic in appearance and was extremely hard and tough. The specific gravity and size of these particles were compared to the same properties of 76 ALUNDUM, and 75 ALUNDUM a random shaped bauxite abrasive manufactured by the Norton Company of Worcester, Massachusetts, and manufactured according to the teachings of the Ueltz patent. All three abrasives were manufactured from the same batch of calcined bauxite. The aforementioned properties of the two sintered bauxite abrasives 75 ALUNDUM and 76 ALUNDUM, and the isostatically hot pressed abrasive of the present invention were as follows:

| Abrasive Type | Specific Gravity | Average Crystal Size |
|---|---|---|
| Isostatically hot pressed abrasive | 3.86 g/cc | Less than 0.5 microns |
| Sintered random shaped (75 Alundum) | 3.69 g/cc | 4 microns |
| Sintered extruded (76 Alundum) | 3.69 g/cc | 4 microns |

The foregoing table of data shows the high specific gravity i.e. 3.86 grams per cc, of the isostatically hot pressed abrasive and the ultra fine microcrystallinity of this material; the 3.86 grams per cc specific gravity was believed to be the theoretical specific gravity of the bauxite used. The relatively low density and 4 micron average crystal size of the two sintered abrasives are typical properties of sintered abrasives manufactured by the known method of cold forming followed by sintering at atmospheric pressure.

What is claimed is:

1. A process for making sintered abrasive grains of theoretical density, by comminuting a base refractory material selected from the group consisting of bauxite, spinel, alpha-alumina, zirconia and mixtures thereof to a powder having an average particle size of less than 1 micron, preforming said fine powder to the approximate size and shape of the abrasive grains desired, and sintering said fine powder making up said preformed abrasive grains, wherein the improvement comprises, accomplishing said sintering step by: (a) mixing said preformed abrasive grains with a quantity of powdered graphite isostatic pressing medium sufficient to totally surround and separate each of said abrasive grains, said isostatic pressing medium being essentially non-reactive with said refractory material, and having a sintering temperature above the sintering temperature of said refractory material; (b) subjecting the mixture of said preformed abrasive grains and said isostatic pressing medium to a pressing temperature between 1200° and 1600°C in a non-oxidizing atmosphere, at a pressure of not less than 2000 pounds per square inch sufficient to cause essentially complete densification of said preformed abrasive grains, for a time period sufficiently short to prevent any significant increase in the average crystal size of the comminuted refractory material; (c) cooling the hot pressed mixture of isostatic pressing medium and abrasive grains; and (d) separating said hot-pressed abrasive grains from said isostatic pressing medium.

2. The process of claim 1 wherein said temperature of pressing is between 1300° and 1500°C, said pressure is not less than 4000 pounds per square inch, and said time for which the preformed abrasive particles are subjected to said temperature of pressing is between 1 and 5 minutes.

* * * * *